United States Patent [19]

Nishino et al.

[11] Patent Number: 4,485,147

[45] Date of Patent: Nov. 27, 1984

[54] PROCESS FOR PRODUCING A SINTERED PRODUCT OF COPPER-INFILTRATED IRON-BASE ALLOY AND A TWO-LAYER VALVE SEAT PRODUCED BY THIS PROCESS

[75] Inventors: Yoshio Nishino; Seiichi Kirigaya, both of Ohmiya, Japan

[73] Assignee: Mitsubishi Kinzoku Kabushiki Kaisha, Tokyo, Japan

[21] Appl. No.: 528,523

[22] Filed: Sep. 1, 1983

[51] Int. Cl.[3] .......... B22F 3/10; B32B 5/18

[52] U.S. Cl. .......... 428/550; 419/2; 419/6; 419/47; 428/567

[58] Field of Search .......... 419/5, 23, 27, 28, 47, 419/2, 6; 428/553, 567, 653, 548, 550; 29/157.1 R

[56] References Cited

U.S. PATENT DOCUMENTS

| | | | |
|---|---|---|---|
| 3,619,170 | 11/1971 | Fisher et al. | 419/5 |
| 4,008,051 | 2/1977 | Cadle | 419/28 |
| 4,168,162 | 9/1979 | Shafer | 419/5 |

FOREIGN PATENT DOCUMENTS

| | | | |
|---|---|---|---|
| 112808 | 10/1974 | Japan | 419/5 |
| 55-505 | 5/1981 | Japan | 419/5 |
| 130408 | 10/1981 | Japan | 419/5 |
| 5801 | 1/1982 | Japan | 419/5 |

*Primary Examiner*—Leland A. Sebastian
*Attorney, Agent, or Firm*—Frishauf, Holtz, Goodman & Woodward

[57] ABSTRACT

A process for producing a Cu-infiltrated sintered Fe-base material without requiring a separate Cu infiltration step is disclosed. The process comprises the steps of preparing two powder mixes, one having a predetermined composition with a powder of infiltrating material containing Cu powder or Cu alloy powder as the primary component, and the other having a predetermined composition without said powder of infiltrating material; pressing the two powder mixes into a compact having said powder of infiltrating material present locally; and sintering the compact under ordinary conditions so as to cause the infiltrant to penetrate into the infiltrant-free area simultaneously with the sintering.

Also disclosed is a two-layer valve seat produced by this process. One layer of the valve seat accounts for the principal part of the seat and is made of an Fe-base sintered material containing Cu or Cu alloy as an infiltrant, and the other layer provides a layer to contact the valve and is infiltrated with Cu through pores during the sintering.

11 Claims, No Drawings

PROCESS FOR PRODUCING A SINTERED PRODUCT OF COPPER-INFILTRATED IRON-BASE ALLOY AND A TWO-LAYER VALVE SEAT PRODUCED BY THIS PROCESS

TECHNICAL FIELD

The present invention relates to a process for producing a sintered product of copper-infiltrated iron-base alloy by simultaneous sintering and cooper infiltration. The invention also relates to a two-layer valve seat produced by this process.

BACKGROUND OF THE INVENTION

Valve seats, ball seats, ratchets and racks that require high resistance to corrosion and impact are made of Cu-infiltrated sintered Fe-base alloys which are produced by the following procedure:

(1) preparing a powder mix providing a single or double formulation (in order to produce a sintered material having both high wear resistance and good toughness);
(2) pressing the mix into a compact of a single phase (if the mix has a single formulation) or a double phase (in upper and two layers if the mix has a double formulation);
(3) sintering the compact by holding it in vacuum or a non-oxidizing atmosphere at a temperature in the range of 1050° to 1200° C.;
(4) placing the sintered compact on or under a separately prepared compact of an infiltrant primarily consisting of Cu powder or Cu alloy powder; and
(5) holding the assembly in vacuum or non-oxidizing atmosphere at a temperature in the range of 1100° to 1200° C. so that the infiltrant enters and closed open pores in the sintered compact.

Internal combustion engines such as automotive engines conventionally use a valve seat made of an Fe-base sintered material the porous area of which is infiltrated with Cu or Cu alloy in order to provide increased corrosion resistance and thermal conductivity, or an Fe-base sintered material the porous area of which is infiltrated with both Cu or Cu alloy and Pb or Pb alloy in order to provide good lubricating properties, as well as improved corrosion resistance and thermal conductivity.

However, the conventional process for producing a sintered product of Cu-infiltrated iron-base alloys is costly because a compact of infiltrating material must be prepared separately from the compact of iron-base alloy and the step of Cu infiltration must be effected after the sintering step.

SUMMARY OF THE INVENTION

Therefore, the present inventors have made studies to develop an economical one-step process for producing a sintered product of Cu-infiltrated Fe-base alloys without involving a separate Cu infiltration step. As a result, they have found that their object can be accomplished by the following procedure:

(1) preparing two powder mixes, one having a predetermined formulation with a powder of an infiltrating material, preferably in an amount of 10 to 40 wt. %, that contains Cu powder or Cu alloy powder as the primary component, and the other having a predetermined formulation free from a powder of infiltrating material;
(2) pressing the two mixes into a compact having said powder of infiltrating material present locally;
(3) sintering the compact under ordinary conditions, such as heating in a cracked ammonia gas atmosphere at a temperature in the range of 1000° to 1150° C.

As a result, not only is the compact sintered but also the infiltrating material moves by capillary action and enters all pores in the infiltrant-free area of the compact to thereby produce a sintered material which consists of two parts, one being Cu-infiltrated and pore-free and the other having open pores left after the departure of the infiltrant. One advantage of the process of the present invention is that it can produce a sintered product which is infiltrated with Cu or Cu alloy only in the area that is required to have a particular property.

A two-layer valve seat using the sintered material made of a Cu-infiltrated Fe-base alloy can be produced by the following procedure:

(1) preparing an Fe-base powder mix which after sintering forms the principal part of a valve seat said mix further including (i) 5 to 35 wt. % of Cu, and optionally 0.01 to 4.0 wt. % of either P or Sn or both, or (ii) 5 to 35 wt. % of Cu, 0.5 to 12 wt. % of Pb, and optionally 0.1 to 4.0 wt. % of either P or Sn or both;
(2) preparing another Fe-base powder mix which after sintering forms a layer to contact the valve, said mix optionally including 0.01 to 4.0 wt. % of either P or Sn or both;
(3) pressing the two powder mixes to form a two-layer compact wherein one layer is composed of the first powder mix and the other layer is composed of the second powder mix.
(4) sintering the two-layer compact.

As an alternative method, separate compacts may be prepared from the two powder mixes and assembled together to form a two-layer compact.

During the sintering stage, the Cu or Cu alloy, preferably together with Pb or Pb alloy, in the Fe-base compact which is to form the principal part of a valve seat migrates (infiltrates) by capillary action into open pores in the Fe-base compact which is to form a layer which will be in contact with the valve, and as a result, the number of open pores in the latter Fe-base compact is reduced to provide a denser Cu- or Cu/Pb-infiltrated layer.

For the purpose of the present invention, the Fe-base compact that is to be sentered to form the principal part of a valve seat contains 5 to 35 wt. % of Cu or both 5 to 35 wt. % of Cu and 0.5 to 12 wt. % of Pb. If the Cu content is less than 5 wt. % or the Pb content is less than 0.5 wt. %, the desired infiltration of open pores with Cu or Pb is not accomplished. If the Cu content and Pb content exceed 35 wt. % and 12 wt. %, respectively, the excessive amount of the liquid phase obstructs complete sintering and the resulting valve seat is low in strength and may deform easily.

According to the present invention, either the Fe-base compact which is to form the principal part of the valve seat, or the Fe-base compact which is to form a layer which will be in contact with the valve, or both types of Fe-base compact may contain P and/or Sn. These elements are effective in improving the fluidity of Cu or Cu alloy or Pb or Pb alloy in the molten state, with the result that infiltration of open pores with Cu or Pb or both is appreciably promoted. If the Sn or P content is less than 0.01 wt. %, their infiltration promoting effect is not obtained, and if their content exceeds 4.0 wt. %, a strong and tough valve seat is not obtained by sintering. Therefore, for the purpose of the present invention, the P and Sn content is preferably within the range of 0.01 to 4.0 wt. %.

Two examples of the process of the present invention are described below.

EXAMPLE 1

The following powders were prepared: graphite powder with an average particle size of 10 μm; Cu powder of under 200 mesh; Fe powder, Co powder, Mo powder, Sn powder, Fe-Mo alloy powder (60 wt. % Mo), Fe-Cr alloy (60 wt. % Cr), martensitic stainless steel powder equivalent to SUS 410 (0.13 wt. % C, 0.82 wt. % Si, 0.91 wt. % Mn, 0.03 wt. % P, 0.02 wt. % S, and 13.1 wt. % Cr), Fe-Cr-Mo alloy (1.0 wt. % Cr and 0.3 wt. % Mo) powder, Fe-Ni-Cu-Mo alloy (1.5 wt. % Ni, 0.5 wt. % Cu and 0.5 wt. % Mo) powder, Cu-Sn alloy (10 wt. % Sn) powder and Cu-Fe-Mn alloy (4.1 wt. % Fe and 6.8 wt. % Mn) powder, all having a particle size of under 100 mesh. Using these powders, samples of two-layer disk compacts having the formulations indicated in Table 1 and measuring 11.3 mm in diameter and 10 mm high were produced at pressures between 4 and 6 tone/cm$^2$. In each sample, the upper layer was composed of a powder mix having no infiltrant, and the lower layer was composed of a powder mix containing an infiltrant made of Cu powder, Sn powder, Cu-Sn alloy powder and Cu-Fe-Mn alloy powder. The thicknesses of the respective upper and lower layers are indicated in Table 1. The compacts were sintered in a modified propane gas atmosphere at temperatures between 1050° and 1200° C. for 30 minutes, thereby producing Cu-infiltrated Fe-base sintered samples No. 1 to No. 9.

As a control, a conventional sample was prepared by the following procedure: a powder mix having the formulation indicated in Table 1 was sintered under the same conditions as described above; the sintered product was overlaid with a compact of infiltrant (Cu powder) measuring 8 mm in diameter and 2.5 mm high; the assembly was subjected to the treatment of Cu infiltration, wherein it was held in a cracked ammonia gas atmosphere at 1120° C. for 10 minutes.

The upper and lower layers of samples Nos. 1 to 9, as well as the comparative sample, were checked for their percentage density, and the results are shown in Table 1.

TABLE 1

| Sample of | Upper layer of compact | | Lower layer of compact | | Percentage Density of sintered material | |
|---|---|---|---|---|---|---|
| sintered material | composition (wt %) | thickness (mm) | composition (wt %) | thickness (mm) | upper layer | lower layer |
| Sample of the present invention | | | | | | |
| 1 | stainless steel: 15, C: 1, Fe: bal. | 5 | C: 1, Cu: 15, Fe: bal. | 5 | 95 | 85 |
| 2 | stainless steel: 15, C: 1, Fe—Mo alloy: 13, Fe: bal. | 4 | C: 1, Cu: 20, Fe: bal. | 6 | 96 | 83 |
| 3 | Fe—Ni—Cu—Mo alloy: 50, C: 1, Ni: 1, Fe: bal. | 2 | C: 1, stainless steel: 4, Cu: 10, Fe: bal. | 8 | 96 | 83 |
| 4 | stainless steel: 10, C: 1, Co: 4, Mo: 2, Fe—Mo alloy: 5, Fe: bal. | 8 | C: 1, Cu: 40, Fe: bal. | 2 | 95 | 85 |
| 5 | Fe—Cr—Mo alloy: 50, stainless steel: 12, C: 1, Fe: bal. | 6 | C: 1, Cu—Sn alloy: 25, Fe: bal. | 4 | 97 | 82 |
| 6 | stainless steel: 15, C: 1, Fe—Cr alloy: 3, Fe: bal. | 5 | C: 1, Cu—Fe—Mn alloy: 25, Fe: bal. | 5 | 95 | 84 |
| 7 | Fe—Ni—Cu—Mo alloy: 50, Co: 2, C:1, Fe: bal. | 6 | C: 1, Cu: 30, Sn: 2, Fe: bal. | 4 | 96 | 82 |
| 8 | C: 0.5, Fe: bal. | 5 | Cu: 30, Fe: bal. | 5 | 96 | 84 |
| 9 | C: 0.5, Fe: bal. | 5 | Cu: 30, Sn: 3, Fe: bal. | 5 | 97 | 82 |
| Conventional sample | stainless steel: 15, C: 1, Fe: bal. (prepared by infiltrating the sintered material with Cu) | | | | 96 | |

EXAMPLE 2

The following powders were prepared: reduced Fe powder of under 100 mesh; carbonyl Ni powder of under 350 mesh; graphite powder with an average grain size of 10 μm; Mo powder of under 350 mesh; Co powder, Cu powder, Fe-Cr alloy (60wt. % Cr) powder, Fe-Mo alloy (60 wt. % Mo) powder, Fe-Nb alloy (60 wt. % Nb) powder, Fe-W alloy (77 wt. % W) powder, Fe-V alloy (80 wt. % V), Fe-S alloy (1 wt. % S) powder, Cu-P alloy (0.1 wt. % P) powder, Cu-P alloy (10 wt. % P) powder, Sn powder, Cu-Sn alloy (0.1 wt. % Sn), and Cu-Sn alloy (10 wt. % Sn) powder, all having a size of under 150 mesh; Cu-Pb alloy (30 wt. % Pb) powder and Pb powder of under 250 mesh; Fe-Si alloy (52 wt. % Si) and Fe-Al alloy (51 wt. % Al) powders of under 100 mesh; and Fe-Mn alloy (60 wt. % Mn) powder of under 200 mesh. Using these powders, samples of a two-layer compact wherein the upper layer would form a layer to contact the valve and the lower layer would form the principal part of a valve seat were produced at a pressure of 6 tons/cm$^2$. The formulations and thickness of the respective layers are indicated in Table 2 below. The samples of the compact were sintered in a cracked ammonia gas at a temperature between 1100° and 1180° C. for 30 minutes. The sintered samples were cut to lengths and trimmed to form 23 ring-shaped samples of the two-layer valve seat of the present invention measuring 34.35 mmφ (O.D.), 27.0 mmφ (I.D.) and 7.4 mm high.

Conventional valve seat samples (A) and (B) were prepared from the formulations indicated in Table 2 by sintering them under the same conditions as above except that the sintered products were infiltrated with Cu or Cu-Pb alloy (30 wt. % Pb) across the entire thickness.

The respective valve seat samples were set in gasoline engines (displacement: 1600 cc) with valves made of JIS SUH-3 and subjected to a wear test by running the engines on leaded gasoline (for samples Nos. 1 to 11) or leadless gasoline (for samples Nos. 12 to 23) at 6000 rpm for 50 hours. After the test, the valve-contacting faces of the samples and the valves were checked for maximum depth of wear. The results are listed in Table 2. The Cu and Pb contents in the valve-contacting layer (1 mm from the top) and the underlying layer (2 mm from the bottom) and the percentage density of each area are also shown in Table 2.

TABLE 2-1

| | Compact for making valve-contacting layer | | Compact for making the principal part of the value seat | | Cu content (wt %) | | Percentage density | | Depth of max. wear at |
|---|---|---|---|---|---|---|---|---|---|
| Valve seat sample | composition (wt %) | layer thickness (mm) | composition (wt %) | valve-contacting (mm) | valve-contacting layer | principal part of valve seat | valve-contacting layer | principal part of valve seat | valve-contact face |
| Samples of the present invention | | | | | | | | | |
| 1 | C: 1%, Cr: 1.5%, Ni: 0.5%, Mo: 7%, | 2.0 | C: 1%, Cr: 1%, Cu: 15%, Fe: bal. | 5.4 | 6.0 | 12.8 | 97 | 88 | 0.04 |
| 2 | CO: 1%, S: 0.1%, | 3.0 | C: 1%, Cr: 1%, | 4.4 | 4.2 | 17.1 | 95 | 86 | 0.02 |
| 3 | Fe: bal. | 3.7 | Cu: 20%, Fe: bal. | 3.7 | 4.3 | 15.1 | 95 | 87 | 0.03 |
| 4 | | 5.0 | C: 1%, Cr: 1%, Cu: 25%, Fe: bal. | 2.4 | 2.9 | 19.0 | 94 | 85 | 0.04 |
| 5 | C: 1%, CR: 1.5%, | 3.0 | C: 1%, Cr: 1%, Cu: 20%, P: 0.04%, Fe: bal. | 4.4 | 5.0 | 16.6 | 96 | 88 | 0.03 |
| 6 | Ni: 8%, Mo: 7%, Co: 5%, Nb: 1%, Fe: bal. | | C: 1%, Cr: 1%, Cu: 20%, Sn: 0.04%, Fe: bal. | | 5.1 | 16.5 | 96 | 88 | 0.03 |
| 7 | | | C: 1%, Cr: 1%, Cu: 20%, P: 1.2%, Fe: bal. | | 5.2 | 16.5 | 96 | 88 | 0.03 |
| 8 | C: 1.3%, Cr: 6.5%, Ni: 0.5%, W: 2.5%, | 3.7 | C: 1%, Cr: 1%, Cu: 25%, Fe: bal. | 3.7 | 9.5 | 15.5 | 96 | 82 | 0.04 |
| 9 | Co: 1%, V: 0.5%, S: 0.1%, Fe: bal. | | C: 1%, Cr: 1%, Cu: 25%, Sn: 1.5%, P: 1%, Fe: bal. | | 10.2 | 14.8 | 97 | 81 | 0.04 |
| 10 | C: 1.2%, Cr: 6.5%, Ni: 0.5%, W: 2.5%, Co: 2%, S: 0.1% Fe: bal. | | C: 1%, Cr: 1%, Cu: 25%, Sn: 2.3%, Fe: bal. | | 9.7 | 15.3 | 97 | 80 | 0.03 |
| 11 | | | C: 1%, Cr: 1%, Cu: 25%, P: 2.3%, Fe: bal. | | 9.8 | 15.2 | 97 | 81 | 0.03 |
| conventional product (A) | C: 1%, Cr: 1.5%, Ni: 0.5%, Mo: 7% Co: 1%, S: 0.1%, Fe: bal. | | | | 6.2 | | 97 | | 0.03 |

TABLE 2-2

| | Compact for making valve-contacting layer | | Compact for making the principal part of the valve seat | | Cu content (wt %) | | Pb content (wt %) | | Percentage density | | Depth of max. wear at valve-contact face | |
|---|---|---|---|---|---|---|---|---|---|---|---|---|
| Valve seat sample | composition (wt %) | layer thickness (mm) | composition (wt %) | layer thickness (mm) | valve-contacting layer | principal part of valve seat | valve-contacting layer | principal part of valve seat | valve-contacting layer | principal part of valve seat | valve seat | valve |
| Samples of the present invention | | | | | | | | | | | | |
| 12 | C: 1 Cr: 1.5 Mo: 7 | 3.7 | C: 1, Cu: 23, Pb:2, Fe: bal. | 3.7 | 5.9 | 17.1 | 0.5 | 1.5 | 96 | 82 | 0.04 | 0.01 |
| 13 | Co: 1 S: 0.1 Fe: bal. | | C: 1, Cu: 20, Pb: 5, Fe: bal. | | 5.8 | 14.2 | 0.4 | 4.6 | 97 | 82 | 0.04 | 0.01 |
| 14 | | | C: 1, Cu: 15, Pb: 10, Sn: 2, Fe: bal. | | 4.4 | 10.6 | 3.0 | 7.0 | 97 | 83 | 0.03 | 0 |
| 15 | | | C: 1, Cu: 20, Pb: 5, Mn: 0.8, Al: 0.2, Fe: bal. | | 5.8 | 14.2 | 1.4 | 3.6 | 97 | 81 | 0.03 | 0 |
| 16 | | | C: 1, Cu: 20, Pb: 5, Cr: 1.5, Mo: 0.4, Fe: bal. | | 5.7 | 14.3 | 1.4 | 3.6 | 97 | 81 | 0.04 | 0 |
| 17 | | | C: 1, Cu: 20, Pb: 5, Cr: 1, Si: 0.7, | | 5.7 | 14.3 | 1.4 | 3.6 | 97 | 81 | 0.05 | 0 |

TABLE 2-2-continued

| Valve seat sample | Compact for making valve-contacting layer: composition (wt %) | Compact for making valve-contacting layer: layer thickness (mm) | Compact for making the principal part of the valve seat: composition (wt %) | Compact for making the principal part of the valve seat: layer thickness (mm) | Cu content (wt %): valve-contacting layer | Cu content (wt %): principal part of valve seat | Pb content (wt %): valve-contacting layer | Pb content (wt %): principal part of valve seat | Percentage density: valve-contacting layer | Percentage density: principal part of valve seat | Depth of max. wear at valve-contact face: valve seat | Depth of max. wear at valve-contact face: valve |
|---|---|---|---|---|---|---|---|---|---|---|---|---|
| | | | Fe: bal. | | | | | | | | | |
| 18 | C: 1.2, Cr: 6.5, Ni: 0.5, | 3.7 | C: 0.6, Cu: 20, Pb: 2, Fe: bal. | 3.7 | 9.0 | 11.0 | 0.5 | 1.5 | 96 | 81 | 0.04 | 0.01 |
| 19 | Mo: 2.5, V: 0.5, Co: 1, S: 0.1 Fe: bal. | | C: 1, Cr: 1, Cu: 25, Pb: 1, Sn: 1.5, P: 1, Fe: bal. | | 10.2 | 14.8 | 0.4 | 0.6 | 97 | 81 | 0.04 | 0.01 |
| 20 | C: 1, Cr: 1.5, Ni: 8, | 5 | C: 1, Cr: 1, Cu: 25, Pb: 5, Fe: bal. | 2.4 | 2.4 | 19.9 | 0.6 | 3.7 | 94 | 85 | 0.04 | 0.01 |
| 21 | Mo: 7, Co: 5, Nb: 1, Fe: bal. | 3.0 | C: 1, Cr: 1, Cu: 20, Pb: 5, P: 0.04, Fe: bal. | 4.4 | 4.0 | 17.4 | 1.2 | 4.2 | 96 | 88 | 0.03 | 0 |
| 22 | | | C: 1, Cr: 1, Cu: 20, Pb: 5, Sn: 0.04, Fe: bal. | | 4.1 | 17.4 | 1.2 | 4.2 | 96 | 88 | 0.03 | 0 |
| 23 | | | C: 1, Cr: 1, Cu: 20, Pb: 5, P: 1.2, Fe: bal. | | 4.1 | 17.4 | 1.3 | 4.2 | 97 | 88 | 0.03 | 0 |
| conventional product (B) | C: 1, Cr: 1.5, Ni: 0.5, Mo: 7, Co: 1, S: 0.1, Fe: bal. | | | | 4.9 | 4.9 | 2.1 | 2.1 | 97 | 97 | 0.03 | 0 |

Table 1 shows that the upper layer of each of samples Nos. 1 to 9 produced by the process of the present invention was completely infiltrated with Cu.

Table 2 shows that two-layer valve seat samples 1 to 23 according to the present invention were characterized by a valve-containing layer that was as dense as the comparative samples because of infiltration of open pores with the Cu or Cu alloy or Pb or Pb alloy from the principal part of the valve seat. Therefore, samples 1 to 11 proved to be as wear-resistant as comparative sample (A), and samples 12 to 23 exhibited wear resistance and lubricating properties as good as those of comparative sample (B).

As will be apparent from the foregoing description, according to the process of the present invention, a sintered material that is infiltrated with Cu or both Cu and Pb only in the necessary area can be produced without requiring a separate Cu or Pb infiltration step. Because of this one-step process and the need to infiltrate only the minimum necessary portion with Cu, this invention will greatly contribute to reducing the cost of the final product as compared with the conventional product.

What is claimed is:

1. A process for producing a sintered product of a copper-infiltrated iron-base alloy comprising the following steps:

(1) preparing two powder mixes, one having a predetermined composition with a powder of infiltrating material containing Cu powder or Cu alloy powder as the primary component, and the other having a predetermined composition without said powder of infiltrating material;

(2) pressing the two powder mixes into a compact having said powder of infiltrating material present locally; and (3) sintering the compact under ordinary conditions so as to cause the infiltrant to penetrate into the infiltrant-free area simultaneously with the sintering.

2. A process for producing a two-layer valve seat made of an iron-base sintered material comprising the following steps:

(1) preparing first and second powder mixes, the first mix containing a powder of infiltrating material mainly composed of Cu powder or Cu alloy powder and which, after sintering, forms the principal part of a valve seat, and the second mix containing no powder of infiltrating material and which, after sintering, forms a layer to contact the valve;

(2) pressing the two powder mixes to form a two-layer compact wherein one layer is composed of the first powder mix and the other layer is composed of the second powder mix;

(3) sintering the two-layer compact under ordinary conditions so as to cause the infiltrant to move from the layer of the first powder mix to the layer of the second powder mix simultaneously with the sintering.

3. A two-layer seat produced from an iron-base sintered material by the process of claim 2.

4. A process according to claim 2 wherein said first powder mix contains 5 to 35 wt. % of copper.

5. A process according to claim 4 wherein said first powder mix further contains 0.01 to 4.0 wt. % of one or both of P and Sn.

6. A process according to claim 2 wherein said first powder mix contains 5 to 35 wt. % of Cu and 0.5 to 12 wt. % of Pb.

7. A process according to claim 6 wherein said first powder mix further contains 0.01 to 4.0 wt. % of one or both of P and Sn and the second powder mix containes 0.01 to 4.0 wt. % of one or both of P and Sn.

8. A two-layer valve seat produced from an iron-base sintered material by the process of claim 4.

9. A two-layer valve seat produced from an iron-base sintered material by the process of claim 5.

10. A two-layer valve seat produced from an iron-base sintered material by the process of claim 6.

11. A two-layer valve seat produced from an iron-base sintered material by the process of claim 7.

* * * * *

UNITED STATES PATENT AND TRADEMARK OFFICE

CERTIFICATE OF CORRECTION

PATENT NO. : 4,485,147

DATED : November 27, 1984

INVENTOR(S) : Yoshio NISHINO et al

It is certified that error appears in the above-identified patent and that said Letters Patent is hereby corrected as shown below:

Title page, left-hand column, under "[22] Filed: Sept. 23, 1981" insert

--[30] Foreign Application Priority Data

Sep. 6, 1982 [JP] Japan ......... 57-155064
Dec. 27,1982 [JP] Japan ......... 57-229299
May 2, 1983 [JP] Japan ......... 58-78021 --.

Signed and Sealed this

*Twenty-fifth* Day of *June 1985*

[SEAL]

*Attest:*

DONALD J. QUIGG

*Attesting Officer* *Acting Commissioner of Patents and Trademarks*